Aug. 22, 1961   R. A. GAITHER   2,997,357
PRE-AIMING LAMPS IN SEALING MACHINE
Filed May 16, 1957   2 Sheets-Sheet 1

INVENTOR.
Raymond A. Gaither
BY
R. F. Barnard
ATTORNEY

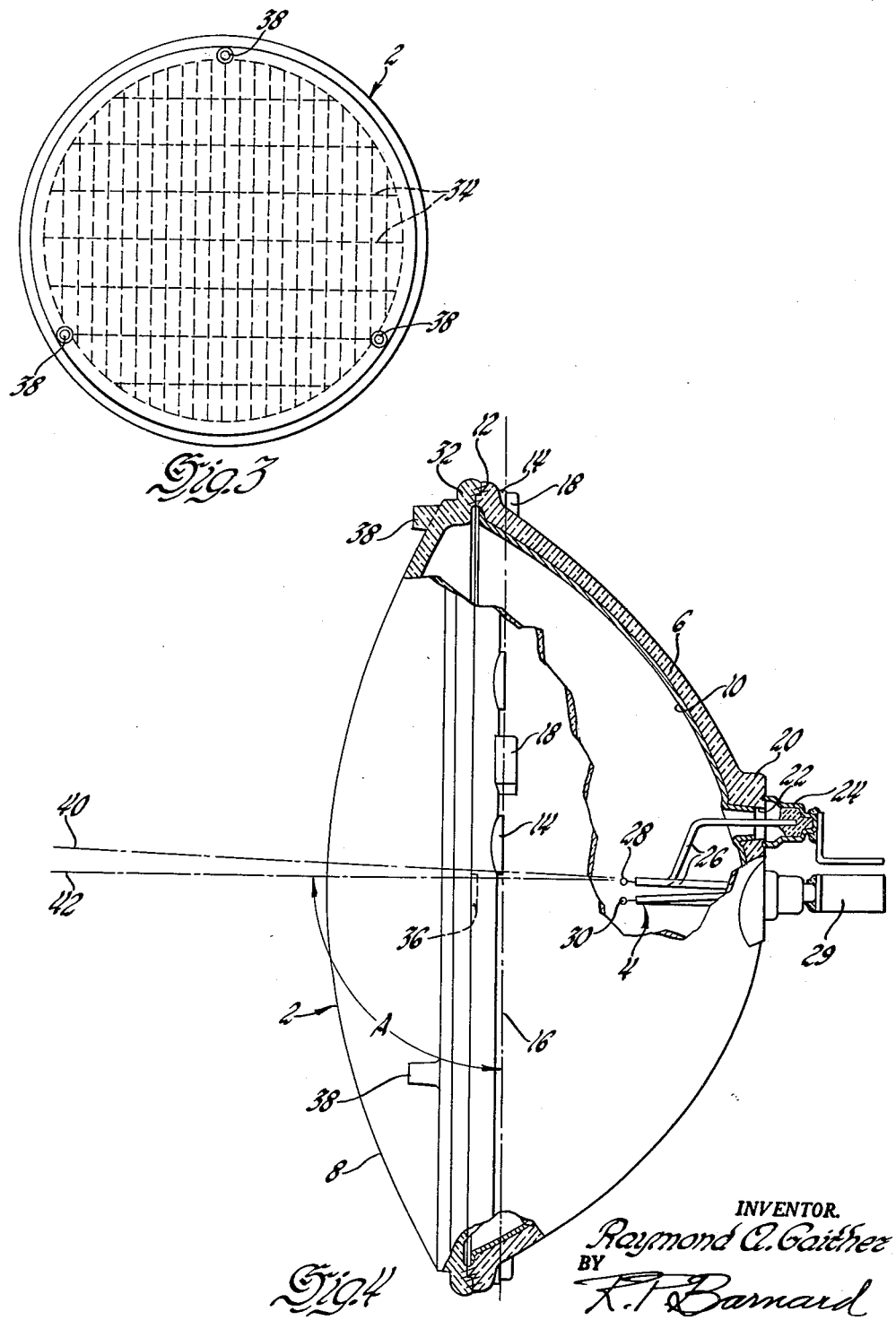

2,997,357
PRE-AIMING LAMPS IN SEALING MACHINE
Raymond A. Gaither, Pendleton, Ind., assignor to General Motors Corporation, Detroit, Mich., a corporation of Delaware
Filed May 16, 1957, Ser. No. 659,701
15 Claims. (Cl. 316—23)

This invention relates to the manufacture of lamps and, more particularly, to an apparatus and metal for manufacturing projection lamps of the type which are provided with an aiming plane having a known disposition with respect to the direction of the light beam projected from the lamp. Lamps of this type are referred to herein as pre-aimed lamps, a typical type of such a lamp being fully described in United States Patent 2,870,362, entitled "Pre-Aimed Light Projector," granted January 20, 1959, in the names of Charles F. Arnold and Edward N. Cole, and assigned to the assignee of this application.

The feature of pre-aiming such as that disclosed in the aforementioned patent, permits aiming of a projection lamp, upon installation of the latter for use, by means of a geometrical instrument with precision previously obtained only by optical aiming. In general, this is accomplished by providing on the lamp structure an aiming plane having a known angular relation to the direction of the light beam projected from the lamp. The desirability of pre-aimed projection lamps, especially vehicle headlamps, becomes more apparent from consideration of presently known lamp production techniques and desired lamp performance.

In the manufacture of projection lamps such as vehicle headlamps, optical imperfections occur in successive lamps manufactured by the same apparatus and technique. This optical imperfection is manifested by lack of uniform relationship of the light beam direction and a selected geometrical axis of the lamp structure. Such relationship for each lamp is unknown and varies randomly because of insufficient precision in the relative positioning and characteristics of the parts of the optical system. Although there has been much effort to improve the manufacturing technique to insure the required precision, this effort has not yielded a commercially successful optically perfect lamp. Consequently, the aiming of projection lamps, particularly vehicle headlamps, with great accuracy has constituted an important problem in the development of improved vehicle lighting.

The numerous approaches in the prior art to the problem of aiming vehicle headlamps may be characterized generally as either optical aiming or geometrical aiming. In optical aiming, the lamp is mounted on the vehicle and illuminated; the light beam is directed upon a simple, remotely located aiming screen or a more complex optical equivalent and the beam pattern is adjusted by directional adjustment of the lamp. Optical aiming of this type has proved to be disadvantageous because it requires elaborate equipment; however, it is quite accurate. In geometrical aiming, the lamp is mounted on the vehicle and a selected axis of the lamp structure is directionally adjusted with reference to one or more axes of the vehicle. Geometrical aiming is highly advantageous in that the aiming apparatus required is simple and inexpensive. Moreover, the aiming may be performed quickly and without the necessity of a large space. Until the development of the pre-aimed projection lamp, geometrical aiming was inaccurate because the relation between the projected light beam direction and the selected axis of the lamp structure was unknown. In the pre-aimed lamp, however, this relation is incorporated with a known value into the lamp structure. Thus, geometrical aiming may be accomplished with the precision of optical aiming.

Generally speaking, apparatus of the type herein contemplated for the manufacture of pre-aimed projection lamps normally include a sealing machine comprising a rotary index turret having a plurality of lamp supports spaced thereon for sequential indexing to various operating stations. At one or more of these stations, the lamp reflector and the lens placed thereon are subjected to jets of flame to heat their mating peripheral edges to a high temperature thereby softening the latter. Thereafter, at some stage in the process and while the mating surfaces are in a plastic state, the interior of the lamp is wholly or partially evacuated to draw the mating peripheral edges of the reflector and lens together to form a seal. Thereafter, in order to relieve any strain in the seal and while the lens is still in a somewhat plastic state, a gas under pressure is supplied to the interior of the lamp to cause the lens to "stretch" thereby relieving these strains. Such an apparatus and method are in common use by the major manufacturers of vehicle headlamps at this date.

After the lamp has been sealed, it is then necessary to establish the aforementioned aiming plane thereon which has a known and predetermined angularity with respect to the direction of light projection therefrom. In Patent 2,880,557, granted to H. E. Todd et al., entitled "Headlamp Pre-Aiming Apparatus," and assigned to the assignee of this invention, there is disclosed an apparatus and method for forming the aiming plane on the sealed lamp structure. Generally speaking, the apparatus disclosed by this patent includes a rotary index turret adapted to receive on suitable supports a plurality of the sealed lamp units for sequential indexing to various operating stations. Included among these stations is an aiming apparatus for securing the desired beam direction, a gauging apparatus for determining an aiming plane, and an apparatus to grind certain portions of the lamp to secure the aiming plane. In this regard, the grinding operation adds materially to the cost of the finished lamp and, as a matter of fact, is a source of some difficulty in that the portions of the glass being ground to provide the aiming plane often chip or break off, resulting in rejects.

Accordingly, it is an object of this invention to provide an improvement in apparatus for manufacturing projection lamps at a high rate of production and with great precision.

More particularly, it is an object and feature of this invention to improve lamp manufacturing apparatus of the type disclosed by the aforementioned Gaither application by combining the operations performed thereby in a lamp sealing machine.

It is another object of this invention to provide an apparatus and method for the mass production of sealed beam lamps in which the lamp may be aimed and an aiming plane having an accurately predetermined relationship with the beam direction may be provided without any grinding operation.

Moreover, it is a still further object of this invention to provide an apparatus and method in which a sealed beam lamp may be successively and automatically aimed and an aiming plane formed thereon at a sinlge station of a sealing machine without requiring any grinding.

In the attainment of the foregoing objects, there is provided a fixed support for the lamp and a dirigibly mounted aiming screen having reference means formed thereon adapted to engage a plurality of surface points on the lamp lens as the latter is stretched in a sealing machine to form an aiming plane, the angular disposition of which relative to the light beam projected on the screen is known. While in its support, the lamp is illuminated projecting a beam on the dirigibly mounted aiming screen which includes a plurality of photocell units sensitive to beam position. The respective photocells are in circuit with electrical control means for servomechanisms which operate to adjust the aiming screen, and with it the reference means, until such time as the desired beam directivity is obtained. Thereafter, a gas under pressure is supplied to the interior of the lamp causing the still plastic lamp lens to move toward the aiming screen to stretch the seal between the lens and reflector. Movement of the surface points on the lamp lens is limited by the reference means mounted on the dirigible aiming screen thereby providing an aiming plane having a known disposition relative to beam direction.

A more complete understanding of the invention will follow from the detailed description below when taken in view of the accompanying drawings in which:

FIGURE 3 is a front elevation of a pre-aimed projection lamp manufactured by the method and apparatus of this invention; and FIGURE 4 is a side elevation, partly in section and partly broken away, of the lamp of FIGURE 3.

Figure 1:
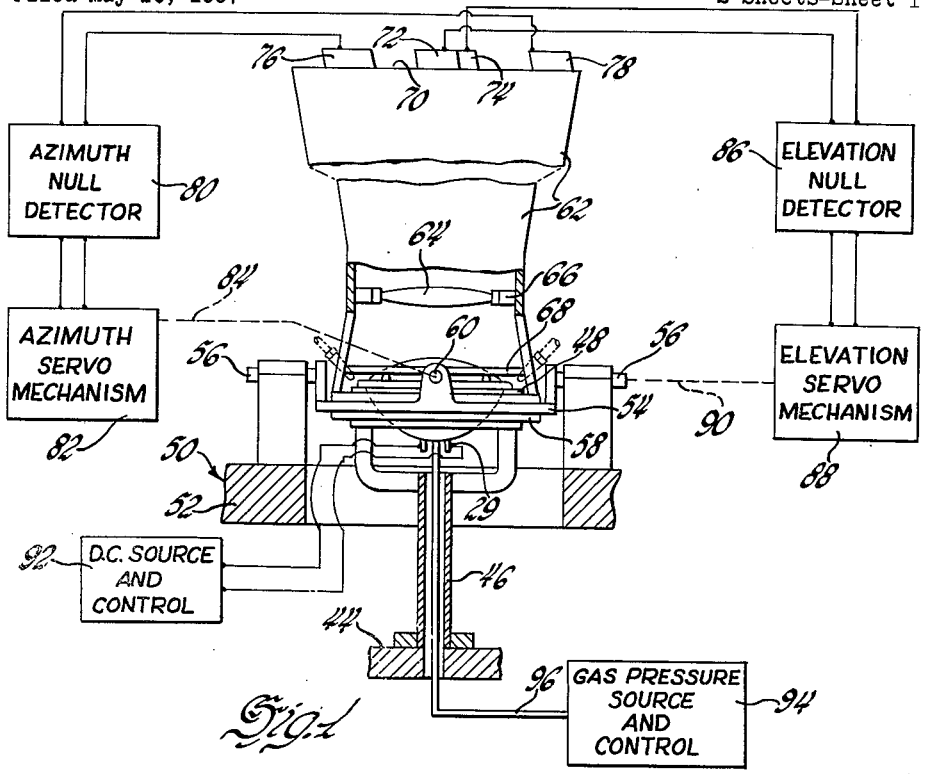
FIGURE 1 is an elevational cross section of the pre-aiming apparatus of this invention.

In the interest of clarity, the apparatus is represented in the drawings in a somewhat diagrammatical manner. To emphasize the features and to avoid obscuring the invention with detail, conventional components necessary to an operative system are represented schematically or symbolically. For example, the electrical devices of conventional design are represented diagrammatically and mechanical connections and devices commercially available or well known in the art are represented schematically.

Referring now to the drawings, and particularly FIGURES 3 and 4, there is shown an illustrative embodiment of the type of projection lamp especially suitable for manufacture by the apparatus and method of this invention. This projection lamp is of the all glass sealed beam vehicle type, although it will be understood that the invention is applicable to lamps of different types and for different uses.

The projection lamp 2 comprises, in general, a light source 4 enclosed by a reflector 6 for imparting directional control to the light rays emanating from the light source, and an integrally joined lens or cover of glass 8 which may impart distributional control to the light rays controlled by the reflector. The reflector is provided with a reflective inner surface or coating 10, preferably a bright metallic deposit. The reflector may be constructed of glass and is suitably molded to provide a configuration having the desired optical properties. For example, the inner surface may be a surface of revolution of paraboloidal curvature or a combination of such surfaces. The reflector terminates in an annular flange 12 which is provided with a plurality of spaced seating surfaces 14 which define a mounting plane 16, and a plurality of orienting lugs 18 for engagement with an associated mounting surface (not shown) for installation of the lamp. The reflector is provided with integrally formed spaced bosses 20 which define passages 22 extending through the reflector. The reflector supports the light source 4 by means of ferrules 24 disposed over the passages through the reflector. The metal ferrules support lead wires 26 suitably secured as by brazing to the former. The light source 4 takes the form of upper beam filament 28 and lower beam filament 30 suitably connected to the lead wires 26. The ferrules are adapted for connection with an associated energizing circuit (not shown) by terminals 29 which are suitably affixed to the ferrules by soldering.

The lens or cover glass 8 of molded glass is provided with an annular flange or rim 32 which is integrally joined by fusion in a sealing apparatus to the annular flange 12 of the reflector. The surface of the lens 8 may be provided with fluting and light controlling prisms indicated schematically at 34 in a manner well understood by those skilled in the art. The lens 8 is oriented with respect to the reflector body 6 by a suitable orienting key or projection 36 on the annular flange 32. A plurality of molded glass bosses or surface points 38 project from the periphery of the lens 8 to establish an aiming plane relative to the direction of the lamp beam. The lamp 2 comprising the integrally combined reflector 6, lens 8 and light source 4 is preferably filled with an inert gas at a pressure exceeding atmospheric pressure and the lamp is hermetically sealed.

As fully disclosed and explained in the aforementioned Patent 2,870,362 of Charles F. Arnold and Edward N. Cole, an ideal lamp, or one which directs selected light rays in a known direction relative to a selected geometrical axis of the lamp structure, is not achieved in commercial production because of lack of precise relative positioning of the parts of the optical system and inaccuracies in individual parts of the system. Thus, a typically optically imperfect lamp may have an actual optical axis 40 of a selected portion of the projected light rays which is not coincident with the intended or desired optical axis 42 having a known angular displacement "A" from a geometrical reference on the lamp structure such as the mounting plane 16 defined by the surface of seating lugs 14. The effect of the optical imperfections, whatever the cause, has been to preclude precise aiming of the projected light by simple geometrical aiming instruments.

In the aforementioned Patent 2,880,557 of H. E. Todd et al., an apparatus and method has been fully disclosed for accurately establishing an aiming plane on such a projection lamp which bears a known and predetermined relation with the actual optical axis of the projected beam or a selected portion thereof. As aforementioned, the apparatus disclosed in this patent includes aiming, gauging and grinding stations successively operating upon the lamp and particularly the bosses or lugs 38 to establish an aiming plane. In the apparatus disclosed in FIGURES 1 and 2 and now to be described, the projection lamp shown in FIGURES 3 and 4 may be mass produced by combining some functions of the respective stations of the aforementioned copending application in a sealing machine, while actually eliminating the grinding operation thereby resulting in the advantages aforementioned.

Figure 2:
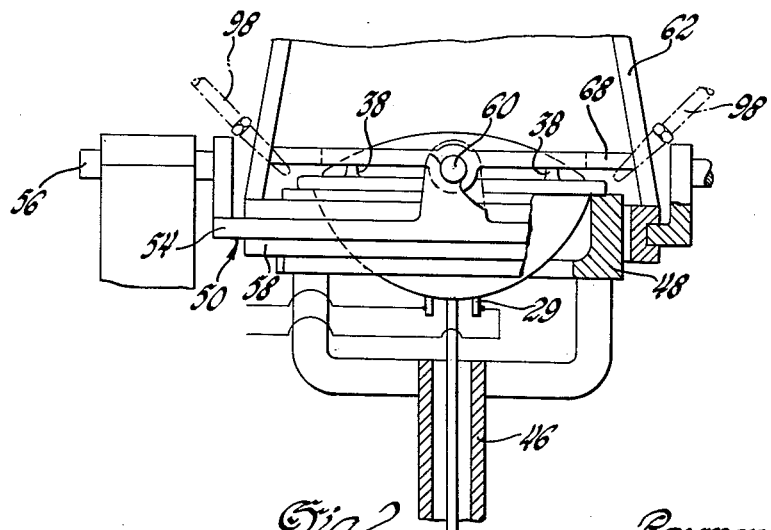
FIGURE 2 is an enlarged fragmentary view of a portion of FIGURE 1.

The apparatus of FIGURES 1 and 2 is intended to be positioned at one station of a conventional lamp sealing machine of the rotary turret type which includes an intermittent drive or indexing mechanism to sequentially index various lamps to different stations for performance of sealing operations thereon during their manufacture. Insofar as it is necessary to the disclosure of this invention, it may be noted that such a sealing machine includes a rotary turret 44 on which there is mounted a column 46 terminating at its upper end in a fixed support, seating nest or table 48.

The pre-aiming station 50 of the sealing machine includes a support 52 on which the gimbal ring 54 is rotatably supported by the trunnion mounted pins 56. An inner ring 58 is rotatably supported at 60 at right angles to the pins 56 on the outer ring 54. An enclosure 62 is fixedly mounted to the inner ring 58 and includes a condensing lens 64 secured in an annular bracket 66 fixed to the side wall of the enclosure. An annular ring 68 or suitable equivalent forming a reference surface or plane is rigidly secured to the side wall of the enclosure 62 and is spaced above the table 48 for a purpose to appear more fully hereinafter.

An aiming screen 70 forming a reference aiming plane is provided at the extreme end of the enclosure opposite the condensing lens 64 from the gimbal rings and extends in a plane parallel to the plane of the annular ring 68. Mounted on the aiming screen are a pair of photocells 72, 74 responsive to the intensity of the light beam projected on the aiming screen on an axis transverse to the axis of the pins 56. Moreover, a pair of photocells 76, 78 are positioned on the aiming screen to sense light falling thereon on an axis transverse to the pivotal connection 60 of the inner ring 58 to the outer ring 54.

For the purpose of this disclosure, the axes of dirigible adjustment of the aiming screen 70 about the axis of pins 56 and 60 will be termed, respectively, the elevation control axis and azimuth control axis.

The azimuth control photocells 76, 78 are connected electrically to an azimuth null detector circuit 80 of any conventional type the output signal of which is supplied to the azimuth servo-mechanism 82 which controls through a suitable operating means 84 rotation of the gimbal ring 58 about the azimuth control axis. Similarly, the elevation control photocells 72, 74 are connected in circuit with an elevation null detector circuit 86 which controls the elevation servo-mechanism 88 connected by suitable operating means 90 to the elevation control axis. A source of electric energy 92 is connected to the terminals 29 of the lamp. A source of gas under pressure 94, preferably nitrogen, is connected to the interior of the lamp in the usual manner by a conduit 96 extending through the support column 46.

As appears clearly in FIGURE 2, some convenient surface, such as but not limited to that defined by the seating lugs 14, is placed on the fixed support or table 48. The lamp 2 will have progressed through various operating stations of the sealing machine during which time the peripheral flanges 12 and 32 will have been heated to a plastic state and sealed. After the sealing operation has been accomplished, the turret 44 will be indexed to the pre-aiming station 50, the support 52 being elevatable if required. The lamp will be illuminated and its beam projected on the aiming screen 70. The respective photocells will then be activated in accordance with the position of the beam on the screen, thereby causing the respective servo-mechanisms to operate as required to rotate the entire enclosure 62 about the azimuth and elevation control axes until such time as the null detector circuits no longer actuate the servo-mechanisms; at this time, the actual optical axis of the lamp beam is known.

A gas under pressure is then supplied to the interior of the lamp assembly through conduit 96 to protect the illuminated light source therein as well as to inflate the lamp to stretch the seal between the peripheral flanges 12 and 32, respectively, of the reflector and lens to remove strains therein. As the lamp is stretched, the lamp lens will move toward the aiming screen 70 and the aiming lugs 38 will strike the annular ring 68. Since this annular ring defines a reference surface or plane which is parallel to the reference aiming plane defined by the aiming screen 70 and has been adjusted with the latter in the process of aiming the lamp, the plane defined by the aiming lugs 38 will now have a known and predetermined relationship with the projected light beam. The burners 98 may be provided on the dirigibly mounted enclosure 62 to maintain the lamp assembly in a somewhat plastic state during this stretching and aiming operation, it being understood that similar burners are employed at previous stations of the sealing machine.

At this juncture, it may be noted that the angle between the axis 40 of actual light beam direction and the reference optical axis 42, while being too large for purposes of mechanically aiming the lamp accurately, is actually quite small. Accordingly, the amount of adjustment of the aiming screen 70 and ring 68 in locating the axis 40 of actual light beam direction will be relatively small. As a result, although one or more of the lugs 38 may be displaced axially of the lamp a greater distance than the other lug or lugs until all lugs abut the annular ring 68, even the most extreme of such distances is merely a fraction of the width of the lens or spacing between lugs 38. Consequently, even though the lens 8 might shift slightly, thereby shifting the axis 40 of actual light beam direction slightly, any such drifting which might occur is not appreciable to the extent of preventing the aiming plane defined by the lugs 38 from being in a predetermined known position relative to actual light beam direction within the relatively small manufacturing tolerances employed.

Thus, it will be seen that the pre-aiming apparatus of this invention incorporated in a conventional sealing machine permits the usual stretching of the lamp assembly seal accompanied by automatic aiming of a sealed beam assembly followed by the formation thereon of an aiming plane or geometrical axis having a known relationship with respect to the lamp beam. Moreover, by using the apparatus and method of this invention for forming the aiming plane renders it unnecessary to perform any grinding operation whatsoever on the aiming lugs 38, thereby reducing the costs of manufacture, eliminating a source of rejects due to chipping of the lugs 38 during grinding and simplifying the apparatus required.

I claim:

1. In the manufacture of projection lamps of the type having a reflector and a lens forming an envelope and a light source enclosed thereby, the method comprising the steps of energizing the source to emit a beam of radiant energy, maintaining a portion of the envelope in a plastic state and displacing said portion until a plurality of spaced discrete reference surfaces on the envelope define an aiming plane in predetermined angular relation to the direction of the beam.

2. In the manufacture of projection lamps of the type having a reflector and a lens forming an envelope and a light source enclosed thereby, the method comprising the steps of energizing the light source to project a light beam from the lamp, relatively adjusting the lamp and a reference surface to position the beam of the lamp and the reference surface in a predetermined angular relation, maintaining a portion of the envelope in a plastic state, and displacing said portion until a plurality of spaced discrete reference surfaces on the envelope engage said reference surface to define a lamp aiming plane in a predetermined known angular position with respect to the direction of said beam.

3. In the manufacture of projection lamps of the type having a reflector and a lens forming a sealed envelope enclosing an incandescent type light source, the method comprising the steps of energizing the light source to project a light beam from the lamp, adjusting the angularity of the lamp relative to a reference plane to position the beam of the lamp and the reference plane in a predetermined angular relation, maintaining a portion of the envelope in a plastic state, and introducing gas pressure to the interior of the envelope to stretch said portion until a plurality of spaced discrete reference surfaces on said envelope engage said reference plane to establish an aiming plane on the lamp in predetermined angular relation to the direction of said beam.

4. In the manufacture of projection lamps of the type having a reflector and a lens forming a sealed envelope enclosing a light source and having a plurality of discrete peripherally spaced bosses on the lens defining an aiming plane for the lamp, the method comprising the steps of energizing the light source to project a light beam from the lamp, relatively adjusting the lamp and a reference surface to position the beam of the lamp and the reference surface in a predetermined angular relation, maintaining a portion of the envelope in a plastic state, and introducing gas pressure to the interior of the envelope to stretch said portion until said bosses engage said reference surface to reposition said aiming plane on the lamp in a predetermined angular relation to the direction of said beam.

5. In the manufacture of projection lamps of the type having a reflector and a lens forming a sealed envelope enclosing a light source and having a plurality of discrete peripherally spaced bosses on the lens defining an aiming plane for the lamp, the method comprising the steps of energizing the light source to project a light beam from the lamp, supporting the lamp in fixed attitude, adjusting a reference surface opposite said bosses to a predetermined angular position with respect to the direction of the light beam, maintaining the sealed juncture of the lens and reflector in a plastic state, and introducing gas pressure to the interior of the envelope to stretch said sealed juncture until the bosses engage the reference surface to reposition said aiming plane on the lamp in a predetermined angular relation to the direction of said beam.

6. The method of manufacturing projection lamps comprising the steps of mounting a light source in a glass reflector having a peripheral rim, locating a glass lens having a peripheral rim upon said reflector, joining the reflector and lens by a fused juncture of the rims to form a light source envelope, supporting said envelope in a fixed attitude, energizing said light source to project a light beam from the lamp, positioning a reference surface opposite said lens in a predetermined angular position with respect to the direction of the light beam, maintaining the fused juncture in a plastic state, and introducing gas pressure to the interior of the envelope to stretch the fused juncture until a plurality of peripherally spaced discrete surfaces on the lens engage the reference surface to form an aiming plane in predetermined angular relation to the direction of said beam.

7. Apparatus for the manufacture of projection lamps of the type having a reflector and a lens forming a sealed envelope enclosing a light source, said apparatus comprising a seating nest for supporting the lamp and adapted to receive the reflector, a reference surface defining a plane adapted for engagement with a plurality of spaced discrete portions of the lens forming an aiming plane, means connected with said reference surface for positioning it opposite said nest in a predetermined position relative to light beam direction, means for rendering plastic the juncture of said lens and reflector, and a source of gas pressure connectible with the interior of the envelope for displacing said lens portions into engagement with the reference surface by stretching of said juncture.

8. Apparatus for the manufacture of projection lamps of the type having a reflector and a lens joined by a fused juncture of peripheral rims to form an envelope enclosing a light source and having a plurality of discrete peripherally spaced bosses on the lens defining an aiming plane for the lamp, said apparatus comprising a seating nest for supporting the lamp, a reference surface defining a plane and adapted for engagement with said bosses, means connected with said reference surface for positioning the latter in a predetermined position relative to light beam direction, heating means for maintaining the fused juncture in a plastic condition, and a source of gas pressure connectible with the interior of the envelope for displacing the lens to cause engagement of the bosses with said reference surface by stretching of said juncture.

9. Apparatus for the manufacture of projection lamps of the type having a reflector and a lens joined by a fused juncture of peripheral rims to form an envelope enclosing a light source and having a plurality of discrete peripherally spaced bosses on the lens to define an aiming plane for the lamp, said apparatus comprising a seating nest for supporting the lamp and adapted to receive the rear surface of the reflector, a dirigibly mounted reference surface defining a plane adapted for engagement with said bosses, circuit means for energizing the light source to produce a light beam, an aiming surface including light responsive pick-up elements thereon movable with said reference surface, servo means connected between the pick-up elements and dirigible reference surface for displacement of the latter to a known position relative to light beam direction, heating means for maintaining the fused juncture in a plastic condition, and a source of gas pressure connectible with the interior of said envelope for displacing the lens to cause engagement of the bosses with said reference surface by stretching of said juncture.

10. Apparatus for the manufacture of projection lamps of the type having a reflector and a lens joined by a fused juncture of peripheral rims to form an envelope enclosing a light source and having a plurality of discrete peripherally spaced bosses on the lens to define an aiming plane for the lamp, said apparatus comprising a seating nest for supporting the lamp, a dirigibly mounted reference surface mounted for pivotal motion about an azimuth and an elevation axis relative to the seating nest, said reference surface defining a plane adapted for engagement with said bosses, circuit means connectible with the light source for energization thereof to produce a light beam, an aiming surface mounted for movement with the reference surface, a pair of elevation axis light responsive pick-up elements disposed on the aiming surface on an axis transverse to the elevation axis of the reference surface, an elevation servo connected between the elevation pick-up elements and the reference surface for displacement thereof about the elevation axis to a known position relative to the light beam direction, a pair of azimuth axis light responsive pick-up elements disposed on the aiming surface on an axis transverse to the azimuth axis of the reference surface, an azimuth servo connected between the azimuth pick-up elements and the reference surface for displacement thereof about the azimuth axis to a known position relative to the light beam direction, heating means for maintaining the fused juncture in a plastic condition, and a source of gas pressure connectible with the interior of the envelope for displacing the lens to cause engagement of the bosses with said reference surfaces by stretching of said juncture.

11. Apparatus for the manufacture of projection lamps of the type having a reflector and lens forming a sealed envelope enclosing a light source, said apparatus comprising a seating nest for supporting the lamp and adapted to receive said reflector, a reference surface defining a plane adapted for engagement with a plurality of peripherally spaced discrete portions of the lamp envelope, servo means operable to adjust the relative positions of said reference surface and said nest until the plane of said reference surface is in a known position relative to the light beam projectable from said source, means for rendering plastic the juncture of said lens and reflector, and a source of gas pressure connectible with the interior of the envelope for displacing said envelope portions into engagement with said reference surface by stretching of said juncture.

12. In the manufacture of a projection lamp of the type comprising a reflector and lens forming an envelope enclosing a light source, a method of forming an aiming plane on the lamp comprising the steps of supporting the envelope in a fixed attitude, placing a reference plane in a predetermined angular position relative to the direction of the beam projectible from said source, maintaining a portion of said envelope in a plastic state, and displacing said portion until a plurality of spaced discrete surfaces thereon abut said reference plane to define said aiming plane.

13. In the manufacture of a projection lamp of the type comprising a reflector and lens joined by a fused juncture of peripheral rims to form an envelope enclosing a light source, and plural discrete projections spaced about the lens periphery adjacent said fused juncture, a method of forming an aiming plane on the lens comprising the steps of supporting the envelope in a fixed attitude, placing a reference plane opposite said projections in a predetermined angular position relative to the direction of the beam projectile from said source, maintaining the fused juncture in a plastic state, and displacing said lens relative to said reflector until said projections abut said reference plane to define said aiming plane.

14. Apparatus for the manufacture of a projection lamp of the type comprising a reflector and lens forming an envelope enclosing a light source, said apparatus comprising a fixed support receiving said envelope, a reference plane, means for disposing said reference plane opposite said support in a predetermined position relative to the direction of the beam projectible from said source, means for rendering plastic a portion of said envelope, and a source of gas pressure connectible with the interior of the envelope for displacing a plurality of spaced discrete surfaces of said plastic envelope portion into engagement with said reference plane to define an aiming plane.

15. Apparatus for the manufacture of a projection lamp of the type comprising a reflector and lens joined by a fused juncture of peripheral rims to form an envelope enclosing a light source, and plural discrete projections spaced about the lens periphery adjacent said fused juncture and defining an aiming plane in a predetermined position with respect to the direction of the beam projectible from said source, said apparatus comprising a fixed support for receiving the lamp reflector in a fixed attitude, a reference plane, means for disposing said reference plane opposite said projections in a predetermined position relative to the direction of the beam projectible from said source, means for rendering plastic the juncture of said lens and reflector, and a source of gas pressure connectible with the interior of the envelope for displacing said lens relative to said reflector until said projections abut said reference plane to define said aiming plane.

References Cited in the file of this patent

UNITED STATES PATENTS

| | | |
|---|---|---|
| 1,329,640 | Snavely | Feb. 3, 1920 |
| 2,459,532 | Ickis | Jan. 18, 1949 |
| 2,633,548 | Kramel | Mar. 31, 1953 |
| 2,689,924 | Honing et al. | Sept. 21, 1954 |
| 2,726,917 | Tyler | Dec. 13, 1955 |

UNITED STATES PATENT OFFICE

CERTIFICATE OF CORRECTION

Patent No. 2,997,357                                      August 22, 1961

Raymond A. Gaither

It is hereby certified that error appears in the above numbered patent requiring correction and that the said Letters Patent should read as corrected below.

Column 1, line 10, for "metal" read -- method --; column 2, line 58, for "sinlge" read -- single --; column 5, line 72, for "drift-" read -- shift- --; column 8, line 27, for "aximuth" read -- azimuth --; line 73, for "projectile" read -- projectible --; column 10, after line 21, insert the following in the list of references cited:

2,762,326    Burkhart-----Sept. 11, 1956
    2,237,186    Malloy--------Apr. 1, 1941
    2,848,843    Schoenoff----Aug. 26, 1958

Signed and sealed this 9th day of January 1962.

(SEAL)
Attest:

ERNEST W. SWIDER
Attesting Officer

DAVID L. LADD
                                                        Commissioner of Patents